US007660196B2

(12) United States Patent  
Saiki et al.

(10) Patent No.: US 7,660,196 B2
(45) Date of Patent: Feb. 9, 2010

(54) METHODS FOR PROCESSING DISPERSIVE ACOUSTIC WAVEFORMS (75) Inventors: Yoshiyuki Saiki, Sagamihara (JP); Oliver Skelton, Beijing (CN); Jahir Pabon, Wellesley, MA (US); Bikash K. Sinha, West Redding, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/847,045

(22) Filed: May 17, 2004

(65) Prior Publication Data
US 2005/0254343 A1 Nov. 17, 2005

(51) Int. Cl.
*G01V 1/40* (2006.01)

(52) U.S. Cl. .......................................... 367/31; 367/32
(58) Field of Classification Search ............. 367/31–32, 367/73, 25; 702/6, 18
See application file for complete search history.

(56) References Cited

U.S. PATENT DOCUMENTS

| 4,594,691 | A |   | 6/1986 | Kimball et al. |
| 4,698,793 | A | * | 10/1987 | Wu ............................ 367/32 |
| 5,081,611 | A | * | 1/1992 | Hornby ........................ 367/25 |
| 5,229,939 | A | * | 7/1993 | Scheibner et al. ............. 702/11 |
| 5,278,805 | A |   | 1/1994 | Kimball |
| 5,587,966 | A |   | 12/1996 | Kimball et al. |
| 5,661,696 | A | * | 8/1997 | Kimball et al. ................ 367/31 |
| 5,784,333 | A | * | 7/1998 | Tang et al. .................... 367/30 |
| 5,987,385 | A | * | 11/1999 | Varsamis et al. ................ 702/6 |
| 6,327,538 | B1 | * | 12/2001 | Chin ............................ 702/18 |
| 6,631,327 | B2 | * | 10/2003 | Hsu et al. ....................... 702/6 |
| 6,654,688 | B1 | * | 11/2003 | Brie et al. ....................... 702/2 |
| 6,868,341 | B2 | * | 3/2005 | Valero .......................... 702/11 |
| 6,920,082 | B2 | * | 7/2005 | Tang ............................ 367/31 |
| 2002/0049540 | A1 | * | 4/2002 | Bevc et al. ...................... 702/2 |
| 2003/0058739 | A1 | * | 3/2003 | Hsu et al. ...................... 367/56 |
| 2004/0001389 | A1 | * | 1/2004 | Tang ............................ 367/31 |

OTHER PUBLICATIONS

Kimball. "Shear slowness measurement by dispersive processing of the borehole flexural mode." Geophysics, vol. 63 (Mar.-Apr. 1998).*
McClellan. "Two-Dimensional Spectrum Analysis in Sonic Logging." IEEE 1986.*
Kozak. "Estimation of formatoin shear slowness using phase velocity and semblance method-comparitive studies.".*
Kimball. "Semblance Processing of borheole acoustic array data." Geophysics, vol. 49 (Mar. 1984).*
Geertis, et al. "The effect of tool on dipole logging." SEG Int'l Meeting, 1997.*
Rao, et al. "Acoustics of fluid filled boreholes with pipe: Guided propagation and radiation." J. Acoust. Soc. Am. 105 (6), Jun. 1999.*
Geerits. et al., "Controid phase slowness as a tool for dispersion correction of dipole acoustic logging data". Geophysics, Jan. 2003, pp. 101-107, vol. 68, No. 1.
C-J. Hsu, B.K. Sinha, "Mandrel effects on the dipole flexural mode in a borehole", J. Acoust. Soc. Am. 104(4), Oct. 1998, pp. 2025-2039.

* cited by examiner

*Primary Examiner*—Scott A Hughes
(74) *Attorney, Agent, or Firm*—Matthias Abrell; Jaime Castano; Dale Gaudier

(57) ABSTRACT

A method for processing acoustic data comprising applying a dynamic filter band. The method and apparatus may be particularly adapted to processing sonic data to measure formation slowness in a borehole.

16 Claims, 9 Drawing Sheets

SENSITIVITY TO $p_k$ = ($Ss=600\mu s/ft$, $Vp/Vs=1.9$, $HD=6\,in$, $Smud=203\mu s/ft$, $DR=2$)

FIG. 3B

SENSITIVITY TO $p_k$ = ($Ss=600\mu s/ft$, $Vp/Vs=1.9$, $HD=12\,in$, $Smud=203\mu s/ft$, $DR=2$)

METHODS FOR PROCESSING DISPERSIVE ACOUSTIC WAVEFORMS

FIELD OF THE INVENTION

The present invention relates generally to methods and apparatus for detecting, removing and/or isolating signals from acoustic waveform data. More particularly, it relates to methods for processing data acquired from sonic borehole logging.

BACKGROUND OF THE INVENTION

Acoustic tools are useful in providing a large range of information regarding formation and borehole parameters adjacent the tools. A primary use of acoustic borehole measurements is for estimating compressional and/or shear wave formation slowness. Formation slowness is not measured directly but rather is determined from the various acoustic waveforms received by the receivers. Formation slowness is often measured by placing an array of sensors in a sonde in a borehole, the array including at least one transmitter and at least one receiver; transmitting an acoustic signal from the transmitter; receiving the acoustic signal with the receiver; and calculating the formation slowness considering the distance between the transmitter and receiver and the time between transmission of the signal by the transmitter and signal receipt at the receiver. Calculating the formation slowness is complex however as many different acoustic types of signals are received in response to a transmitted signal. A single transmitted acoustic signal, whether monopole, dipole, quadrapole, or multipole, can generate a variety of waves in a borehole environment that are received by the receivers. To process the acoustic data, it is necessary to separate and classify the various received waves into general waveform categories such as compressional, shear and Stoneley arrivals.

One method to estimate formation slowness is the slowness-time coherence (STC) method wherein the semblance peaks of the waveforms received by the sensor array are located in a slowness-time plane. U.S. Pat. No. 4,594,691 describes STC processing and is incorporated herein in its entirety. Certain received signals, such as those generated by the dipole flexural mode, are dispersive. For dispersive modes, a dispersive variation of STC processing, such as Dispersive STC (DSTC) processing as described in U.S. Pat. No. 5,278,805 and QDSTC as described in U.S. Pat. No. 5,587,966, each of which are incorporated herein in their entirety, is useful when processing dispersive acoustic data. One particular use of STC processing is to determine the compressional and shear slowness of the formation.

STC semblance processing facilitates the determination of slowness for various components propagating across an array of sonic waveforms. The result of semblance processing is normally represented in a two-dimensional time-slowness map (time vs. slowness). The result of semblance processing is normally presented versus depth by projecting the time-slowness map onto the slowness axis according to the following equation:

$$P_i(s) = \max_t \rho_i(S, t)$$

where $P_i$ is the slowness projection, and
$p_i$ is the semblance computed at each level, which is a function of the slowness, S, and time, t.

In STC processing, a window or band in the slowness-time plane is identified with each type of arrival. In order to minimize the effect of parameter uncertainty in dispersive STC, the processing band is dynamically adjusted depending on the stacking slowness and the measured borehole diameter, taking the sensitivity to these parameters into account. Although robust and useful, DSTC processing has limitations. Basic assumptions in DSTC processing are that borehole formations are homogeneous, isotropic formations and that the tool effects in the received signals owing to the presence of the tool in the borehole can be easily addressed. As advances are made in borehole acoustic tools and processing of sonic logging data, these assumptions may be revisited.

In dipole sonic logging, a flexural wave moves through the borehole fluid and along the borehole wall at a rate dependent upon the velocity of the borehole fluid (i.e. mud slowness) and the shear slowness of the formation. The flexural mode is also sensitive to other parameters such as borehole diameter, densities and compressional slowness of the formation. These parameters need to be considered but their exact values may be difficult to determine. The lack of precise values for the parameters means that the final slowness estimation will also include some degree of uncertainty. Furthermore, these can vary throughout the borehole logging, making it inaccurate to apply a uniform value or correction throughout a logged interval.

In evaluating sonic data, it would be useful to provide a measure of the degree of uncertainty in the final slowness estimation. The present invention is directed toward a method of determining dispersion factors in dipole sonic logging and the sensitivity of the calculated formation shear slowness to such factors. In particular, the present invention provides methods to determine the sensitivity of the flexural mode slowness to the formation shear slowness in dipole acoustic logging.

Additional advantages and novel features of the invention will be set forth in the description which follows or may be learned by those skilled in the art through reading these materials or practicing the invention. The advantages of the invention may be achieved through the means recited in the attached claims.

SUMMARY OF THE INVENTION

The present invention provides methods to minimize the possibility of error in acoustic data caused by the presence of the tool in the borehole and other uncertainties in the model parameters. The present invention provides a method for processing acoustic data using DSTC processing that comprises calculating dispersion sensitivity and implementing a dynamic processing frequency band to minimize the effects of model error. The method further comprises determining sensitivity limits or "cut-offs" in the received acoustic data for various parameters, including tool presence in the borehole. One such limit on the useful frequency band for processing is established by the realization that the sensitivity of the flexural mode arrivals depends on the frequency of the transmitted signal. Another embodiment of the present invention comprises an iterative process at each depth level wherein a first slowness is estimated using parameters assuming a homogenous isotropic model, and then semblance processing is iteratively repeated until a stop criteria is satisfied. Examples of stop criteria include a decreased error bar size, a minimized change in slowness between iterations, or a coherence (mean or peak) that decreases below a threshold.

BRIEF DESCRIPTION OF THE DRAWINGS

The accompanying drawings illustrate preferred embodiments of the present invention and are a part of the specification. Together with the following description, the drawings demonstrate and explain the principles of the present invention.

DETAILED DESCRIPTION

Figure 1:
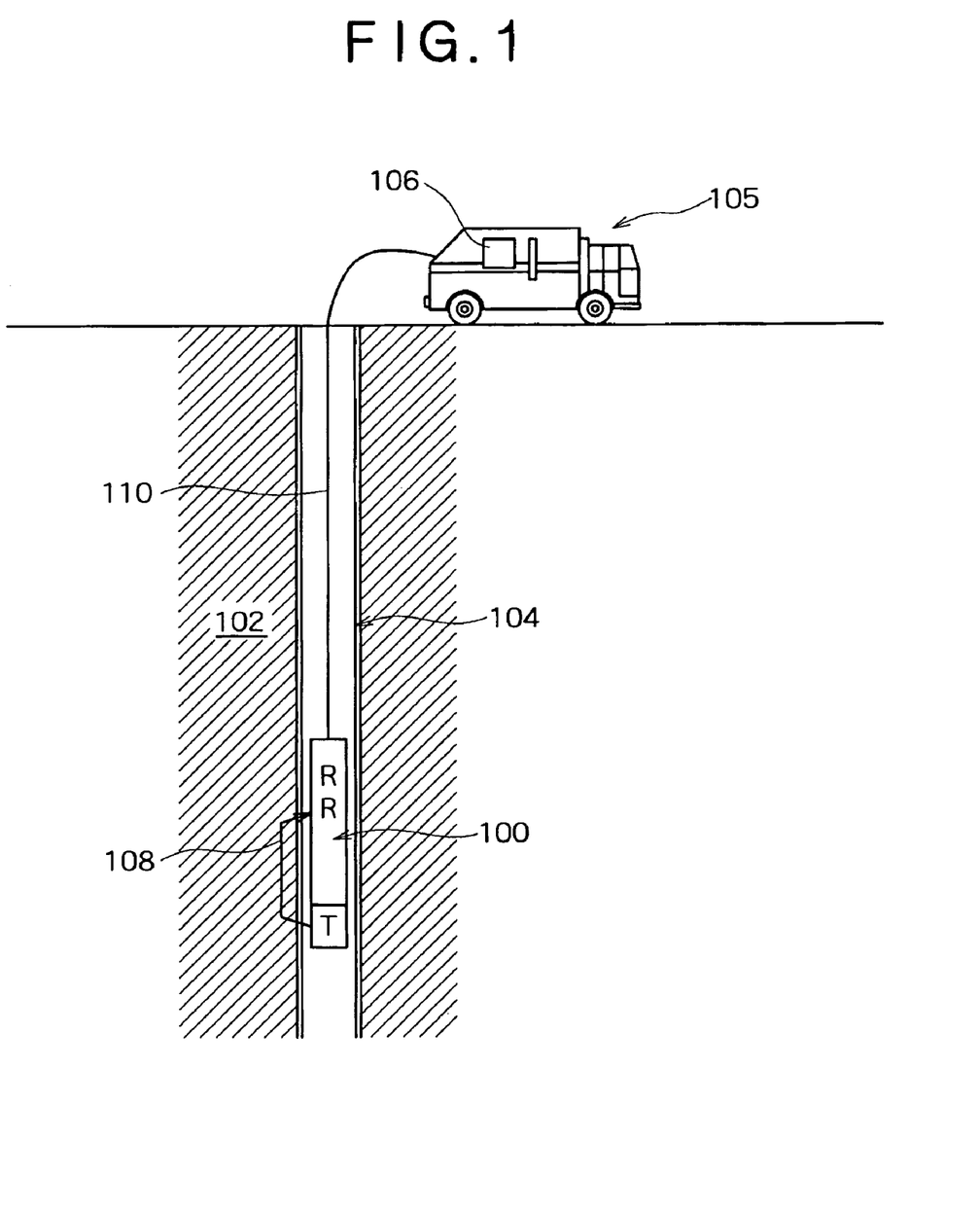
FIG. 1 shows a schematic of a conventional acoustic tool disposed in a borehole.

Turning now to the figures, and in particular to FIG. 1, an acoustic tool (100) is shown adjacent to a homogeneous formation (102). The homogeneous formation (102) is cased with a casing (104). The acoustic tool (100) includes at least 3 transducers consisting of at least one transmitter (T), and at least one receiver (R). In the present embodiment there are two receivers (R) and one transmitter (T), however, many more receivers (R) and transmitters (T) may also be used. The one transmitter (T), two receiver (R) arrangement shown is exemplary in nature and there may be a full array of receivers and/or transmitters, or a single transmitter (T) and receiver (R). The receivers (R) and transmitter (T) are coupled to a computer processor (106) for collecting and processing data from the acoustic tool (100). Also shown is a wave ray path (108) representing a path for a compressional wave caused by activation of the transmitter (T). The receivers (R) may be of different types, including, but not limited to, piezoelectric and magnetostrictive receivers. The receivers (R) are able to detect the arrival of sonic waves.

Information or data collected from the acoustic tool (100), which may include waveforms generated by the receivers (R) over time, is sent to the computer processor (106) via a cable (110) from which the acoustic tool (100) is suspended. Data may also be sent between the computer processor (106) and the receivers (R) by any other convenient communication technique. The computer processor (106) is commercially available from a wide variety of sources. The acoustic data taken by the acoustic tool (100) and received by the computer processor (106) may be processed according to STC processing.

In one embodiment, the method of the present invention comprises generating a set of estimated slowness curves. Slowness calculations are sensitive to a variety of borehole parameters, including parameters such as borehole diameter, fluid slowness, density and the ratio of compressional slowness (Vp) to shear slowness (Vs). In order to evaluate the error in the slowness estimation, the sensitivity of the dispersion to the various parameters is computed. The sensitivity of the flexural mode dispersion in the fluid-filled borehole may be estimated as follows:

Let $$P=\{P_1, P_2, P_3, P_4, P_5\}=\{S_s, V_p/V_s, HD, S_{mud}, DR\} \quad (1)$$

The relative sensitivity of the flexural mode slowness, $s_k(P_0, f)$, to the parameter, $P_k$, at frequency, f, was defined as:

$$s_k(P_0, f) = \frac{P_k}{S_{flex}(P, f)} \frac{\partial S_{flex}(P, f)}{\partial P_k}\bigg|_{P=P_0} \quad (2)$$

where $S_{flex}(P,f)$ is the phase slowness of the flexural wave for the parameter P at frequency f; $S_s$ is the formation shear slowness; Vp/Vs is the ratio of compressional and shear wave speed; HD is the borehole diameter; $S_{mud}$ is the fluid slowness and DR is the ratio of the formation and fluid densities.

Figure 2A:
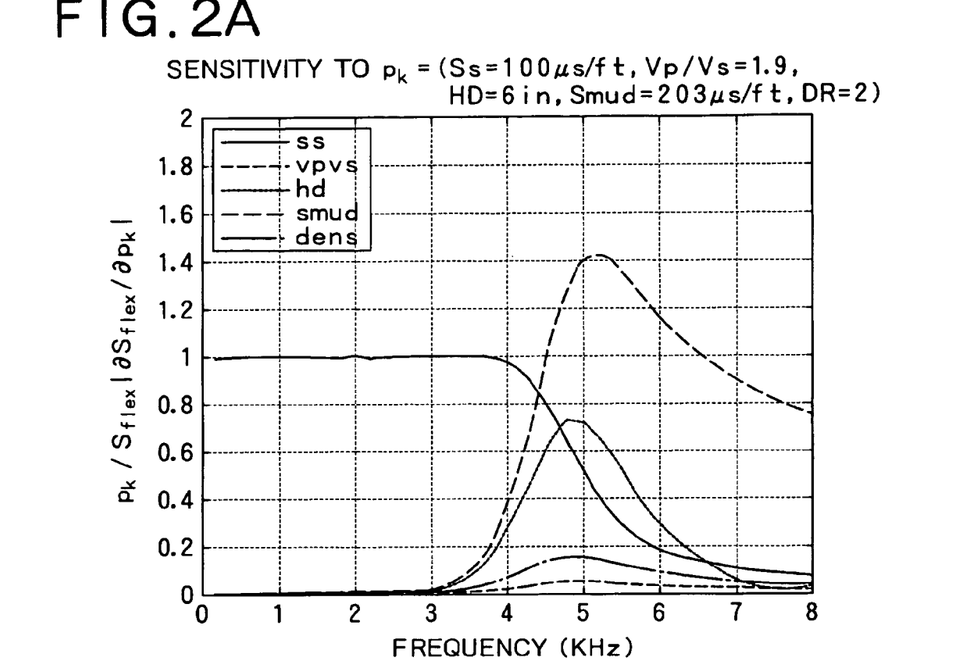
FIGS. 2A and 2B show the sensitivity of the flexural mode slowness to the various parameters in a fast formation.
Figure 2B:
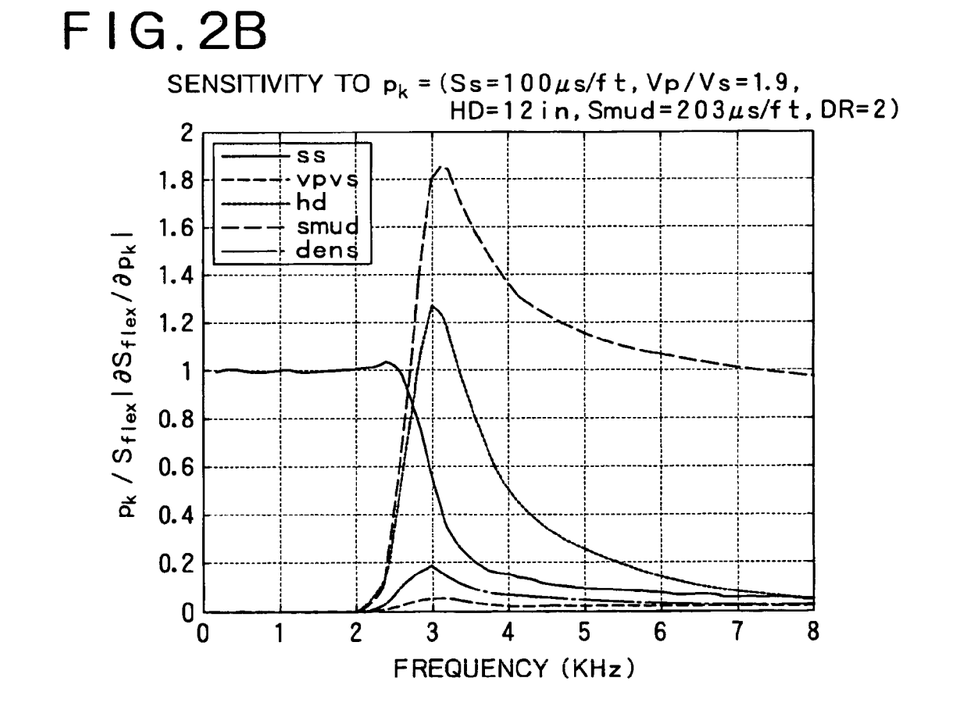

FIGS. 2A and 2B show the sensitivity of the flexural mode slowness to the various parameters in a fast formation. As seen in FIGS. 2A and 2B, the sensitivity of the flexural mode slowness to the formation shear slowness in a fast formation drops out at a certain frequency and the sensitivity to other parameters, especially borehole diameter and fluid slowness, becomes dominant. For example, in the fast formation (Ss=100 µs/ft), the sensitivity to the shear slowness drops rapidly at 4 kHz for the 6-inch borehole (FIG. 2A) and at 2.5 kHz (FIG. 2B) for the 12-inch. Conversely, the sensitivity to the borehole diameter and mud slowness grows rapidly at these frequencies. Therefore, it is desirable that the processing frequency band be below this frequency to filter out these sensitivity effects.

Figure 3A:
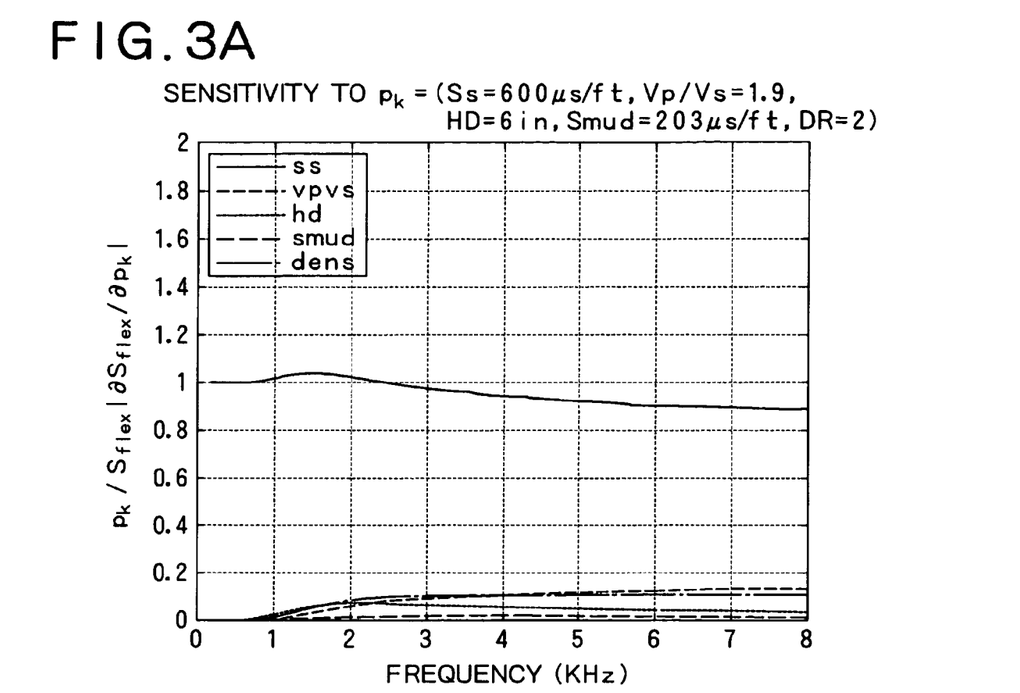
FIGS. 3A and 3B show the sensitivity of the flexural mode slowness to the various parameters in a slow formation (e.g. Ss=600 µs/ft)
Figure 3B:
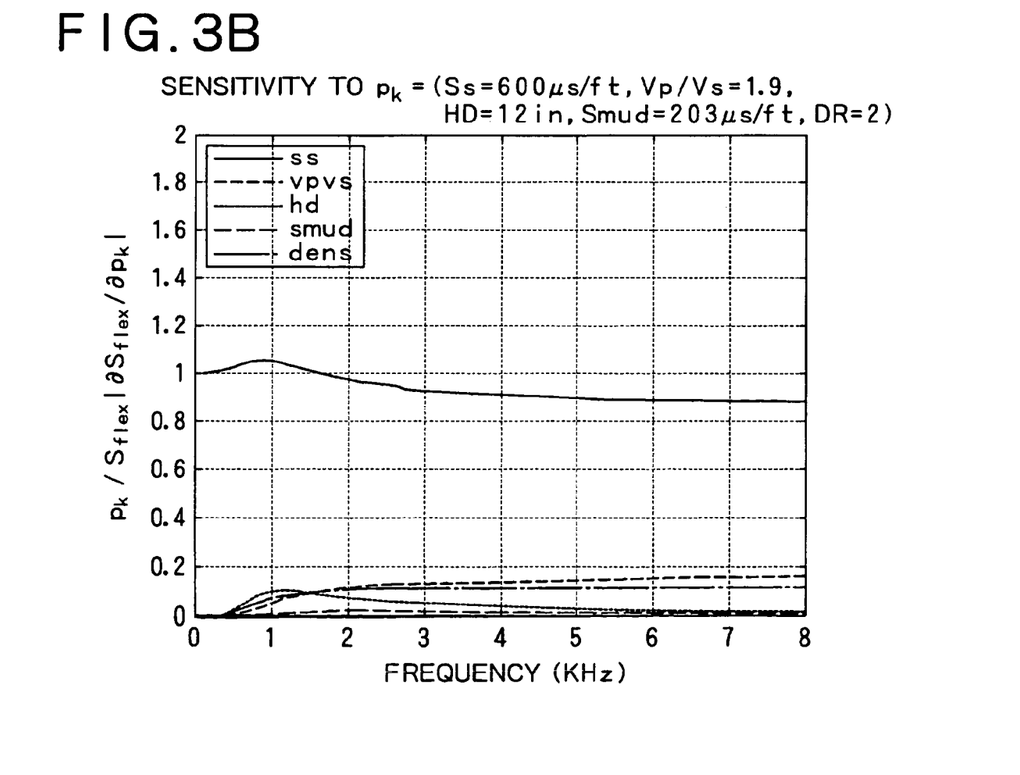

FIGS. 3A and 3B shows the sensitivity of the flexural mode slowness to the various parameters in a slow formation (e.g. Ss=600 µs/ft). As seen in FIGS. 3A and 3B, the sensitivity of the flexural mode slowness to the formation shear slowness does not change as much as it does for fast formation. Also, the sensitivity to the other parameters is relatively low. Thus in slow formations, the entire frequency component may be utilized to get the highest possible signal level.

Figure 4A:
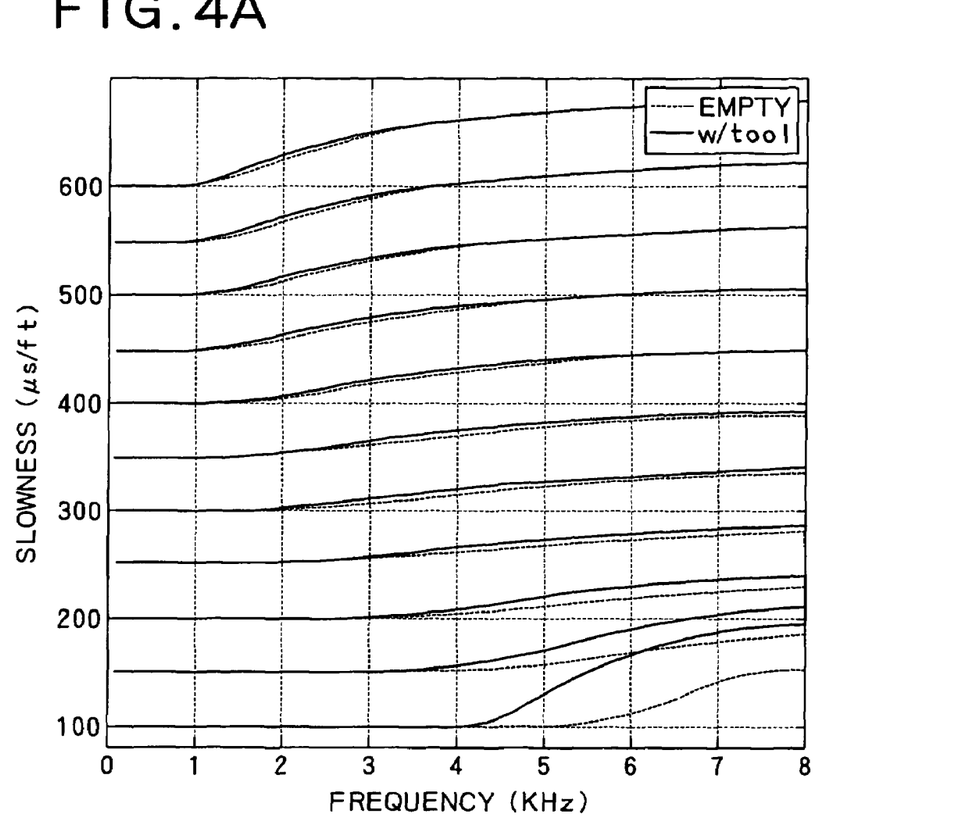
FIG. 4A displays model results for configurations in a six-inch borehole with the tool in the borehole and results for borehole configurations with fluid only in the boreholes for various combinations of signal frequency and calculated slowness.
Figure 4B:
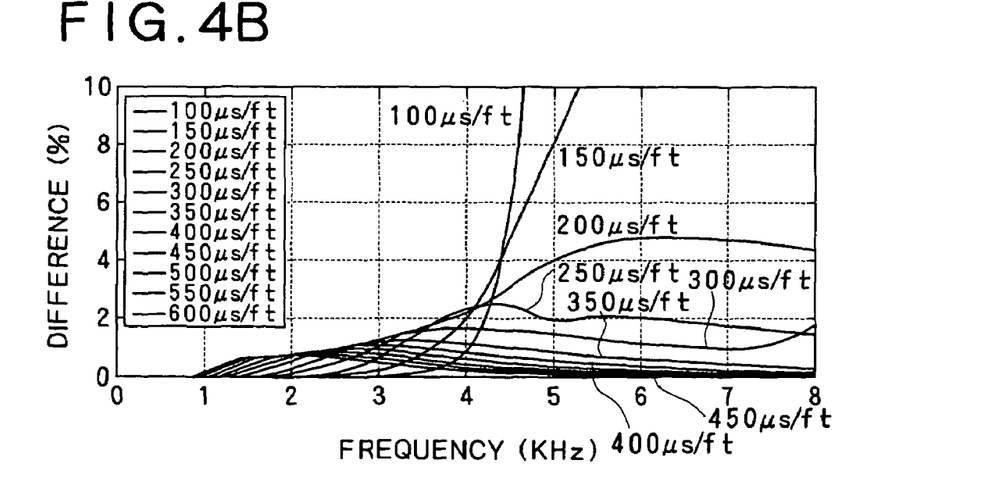
FIG. 4B shows the difference in slowness between tool-included and tool-absent models across the frequency range from 0 to 8 kHz as modeled in a six-inch borehole.
Figure 5A:
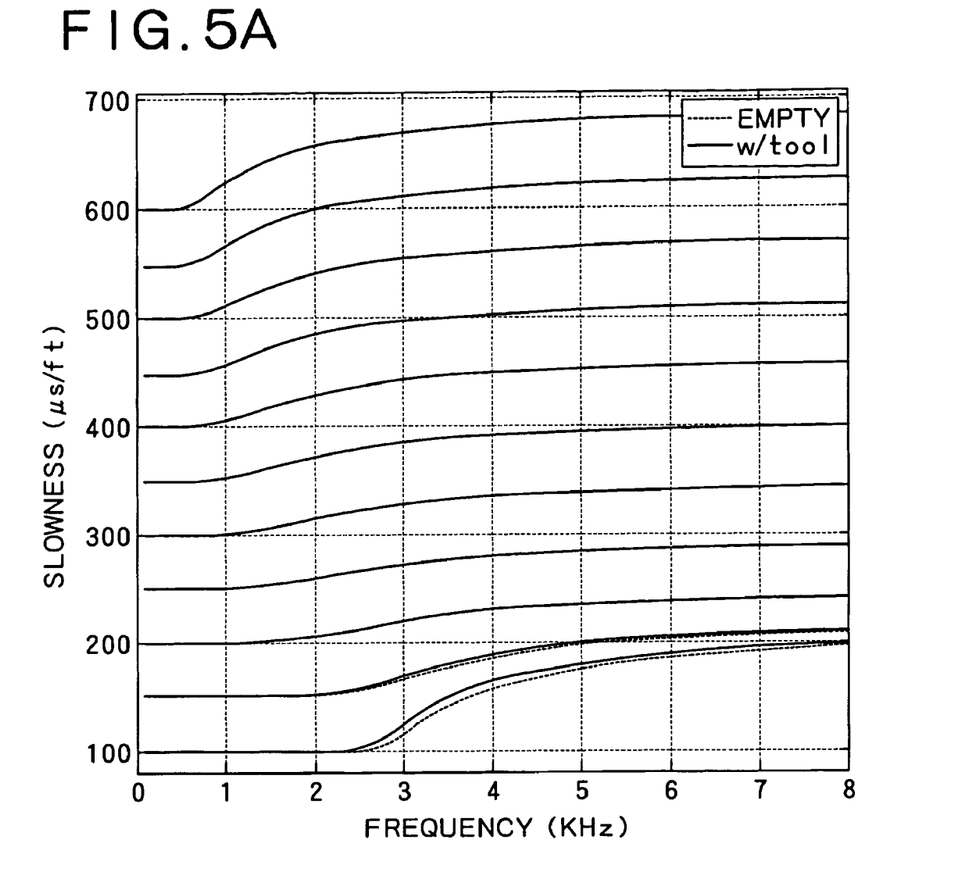
FIG. 5A displays model results for configurations in a twelve-inch borehole with the tool in the borehole and results for configurations with fluid only in the boreholes for various combinations of signal frequency and calculated slowness.
Figure 5B:
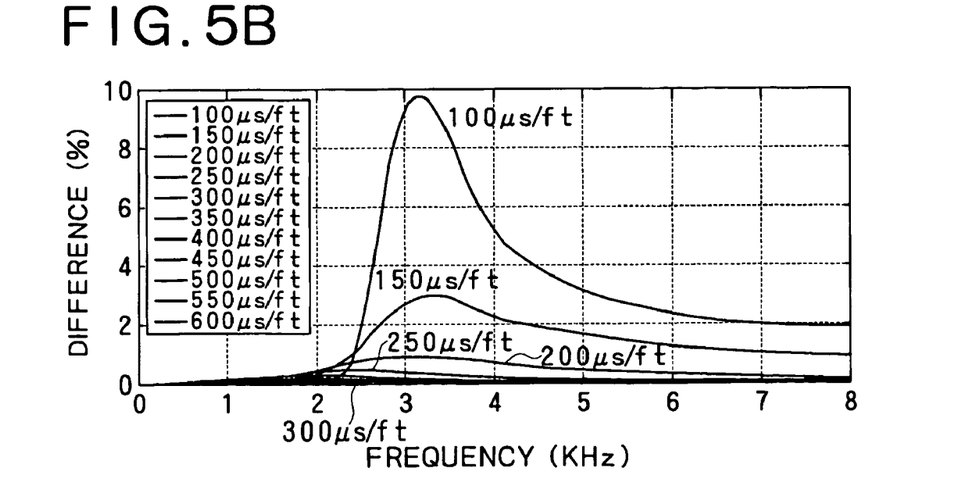
FIG. 5B shows the difference in slowness between tool-included and tool-absent models across the frequency range from 0 to 8 kHz as modeled in a six-inch borehole.

Slowness calculations also may be sensitive to the presence of the tool in borehole. Another embodiment of the present invention comprises a method of determining formation slowness, the method considering the effect of the tool presence in a borehole, by modeling a borehole tool structure and a fluid-filled borehole by equivalent coaxial materials and searches for the various arrival modes. FIG. 4A displays model results for configurations in a six-inch borehole with the tool in the borehole and results for borehole configurations with fluid only in the boreholes for various combinations of signal frequency and calculated slowness. FIG. 4B shows the difference in slowness between tool-included and tool-absent models across the frequency range from 0 to 8 kHz as modeled in a six-inch borehole. FIG. 5A displays model results for configurations in a twelve-inch borehole with the tool in the borehole and results for configurations with fluid only in the boreholes for various combinations of signal frequency and calculated slowness. FIG. 5B shows the difference in slowness between tool-included and tool-absent models across the frequency range from 0 to 8 kHz as modeled in a six-inch borehole.

It is noted that, in general, the difference in the frequency band where the sensitivity to the formation shear slowness is unity is very small or negligible. The sensitivity cut-off in the fast formation (Ss=100 μs/ft), small borehole (HD=6 in.), is about 4 KHz (FIG. 2A) and the difference in dispersion curves is less than 1% up to this frequency (FIG. 4A). The difference in dispersion curve in the large borehole (HD=12 in.) is again less than 1% up to 2.3 KHz (FIG. 5). Note that the sensitivity cut-off frequency depends on the tool structure, borehole diameter and formation shear slowness (FIG. 2, 3). Therefore, careful selection of the processing frequency band is essential in order to maintain the validity of this observation. Also note that the effect of the tool presence depends on both the borehole diameter and the formation slowness (FIGS. 4, 5).

The difference in dispersion curves due to the tool presence is about 1% up to 3 KHz, which covers most of the signal, and the sensitivity to the borehole diameter is relatively low in the 6-in. borehole (FIG. 4) and is always less than 1% in the borehole larger than 12 in. (FIG. 5). Compared to the dispersion curve for the borehole with no tool present, the dispersion curve when the tool structure is present is shifted slightly to the lower frequency and almost equivalent to the slightly larger borehole.

Figure 6A:
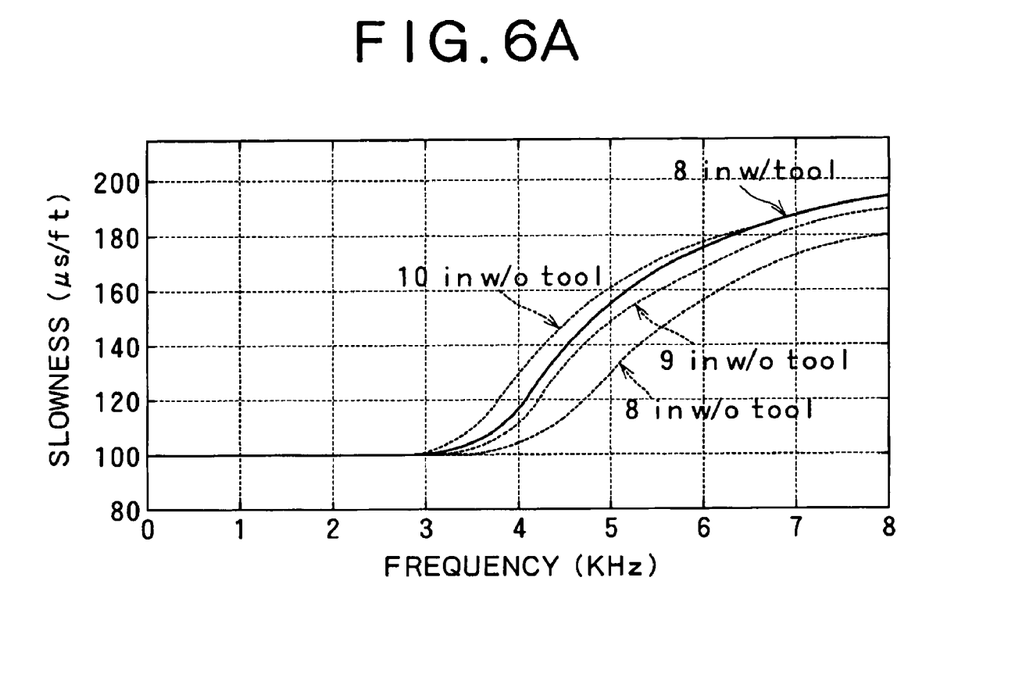
FIG. 6 shows a residual difference value minimized in order to permit an equivalent borehole diameter to be defined.
Figure 6B:
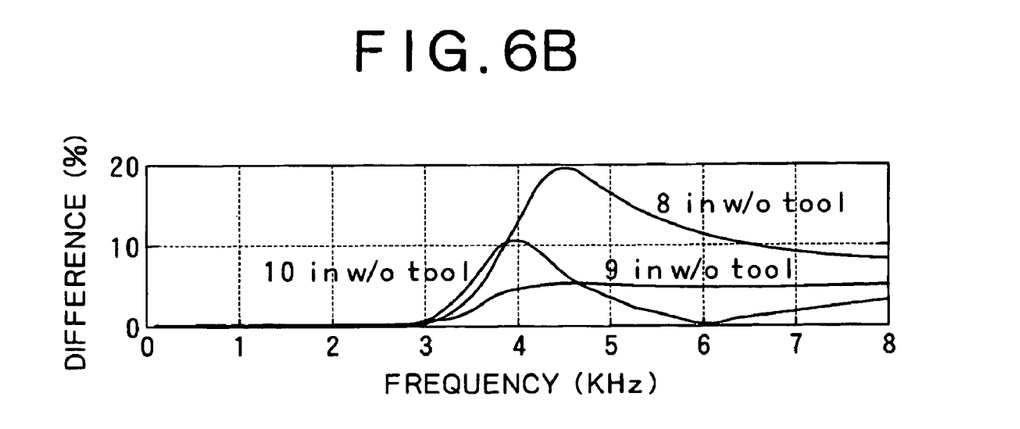
Figure 7:
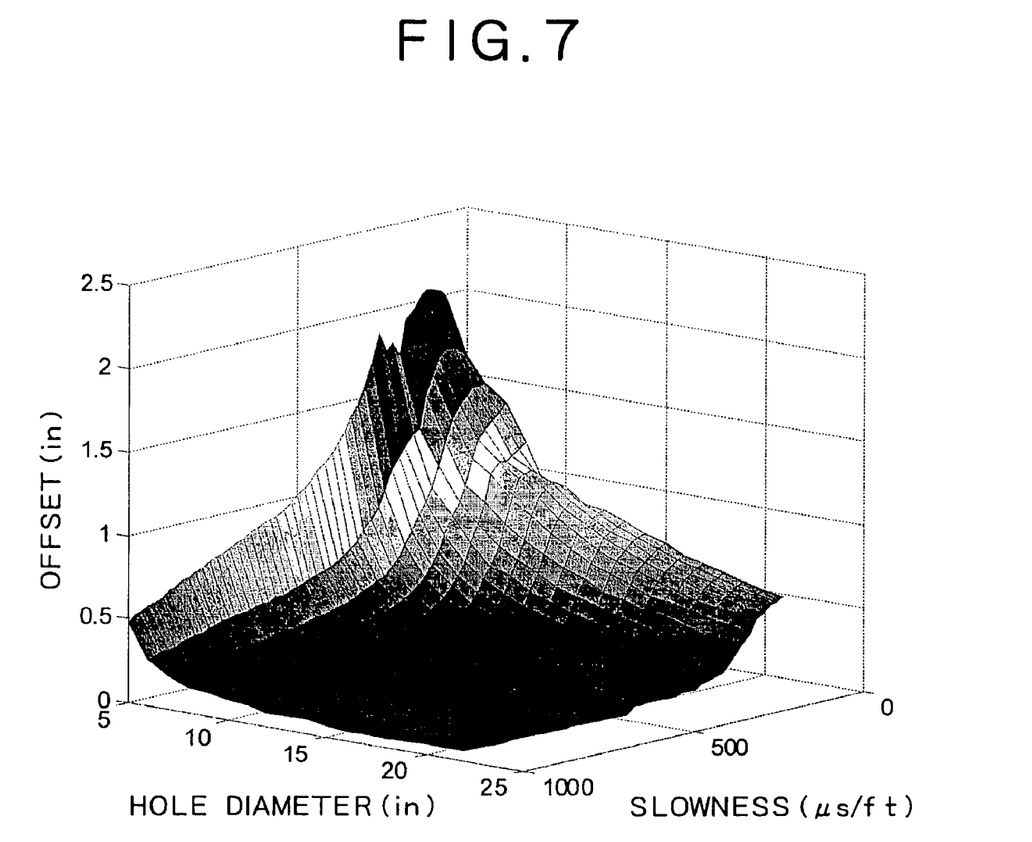
FIG. 7 shows a set of tables of offsets a(S,d) for different fluid slownesses.

In some embodiments of the present invention, the frequency selection is performed dynamically using automatic and adaptive frequency filter band selection. Because the sensitivity cut-off frequency with the tool present is the focus of interest, the relationship between dispersion curves with and without tool presence will be derived. In order to obtain this relationship, the residual difference, R, of the two dispersion curves is defined as:

$$R = \sum_f |S_{S_s}(S,f)\{S_{tool}(S,f,d) - S_{empty}(S,f,d+a(S,d))\}|^2 \quad (3)$$

where S is formation shear slowness, $S_{Ss}$, is the sensitivity to the formation shear slowness, $S_{tool}$ is the dispersion curve with the tool present and $S_{empty}$ is the dispersion curve without the presence of the tool, d is the borehole diameter, and f is the frequency. R is then minimized for a, for each S and d (FIG. 6), thereby permitting an equivalent borehole diameter to be defined as d+a(S,d) wherein a(S,d) is the offset. A set of tables of offsets a(S,d) (FIG. 7) for different fluid slownesses may be computed and is included in the DSTC.

Using the generated set of dispersion curves computed for given parameters, (Vp, fluid slowness and density), it is possible to determine the expected uncertainty in shear slowness estimation, e, due to the expected uncertainty in the borehole diameter measurement, $\delta_{hd}$, by taking the ratio of sensitivity to the borehole diameter, $s_{hd}$, and the sensitivity to the formation shear slowness, $s_{shear}$.

$$e(S,f) = \frac{s_{hd}(S,f)}{s_{shear}(S,f)} \delta_{hd}, \quad (4)$$

The equivalent borehole diameter may then be used to determine the frequency upper limit and the expected uncertainty in shear slowness estimation, e, the processing upper limit $f_a$ (S) may be defined as a frequency $f_u$ where the integral of e(S,f) from 0 to $f_u$ reaches a predefined threshold, E, for each slowness, S.

$$E \geq \int_0^{f_u} e(S,f) df, \quad (5)$$

E and $\delta_{hd}$ may be set to initial values, for example, 25 and 0.1 respectively. Optimal value for E and $\delta_{hd}$ may be determined from experimental data. In order to consider the effect of the presence of a tool, according to one embodiment of the invention, an offset a(S,d) may be added to the borehole diameter, such that the upper frequency may be calculated as:

$$f_{upper} = f_a(s,d)(a(S,d)+d)/d, \quad (6)$$

alternatively, the following expression could also be used:

$$f_{upper} = f_a(S,d\_e), \quad (7)$$

where d_e is the equivalent borehole diameter.

In some embodiments, the processing frequency lower limit may be calculated to have a constant factor defined as:

$$q = \frac{1}{2} \frac{(f_{upper} + f_{lower})}{(f_{upper} - f_{lower})} \quad (8)$$

wherein q is fixed initially at 1.0 and the center frequency is the Airy phase frequency, numerically calculated as the frequency where dk/dω) of the mode has a maximum value.

Figure 8:
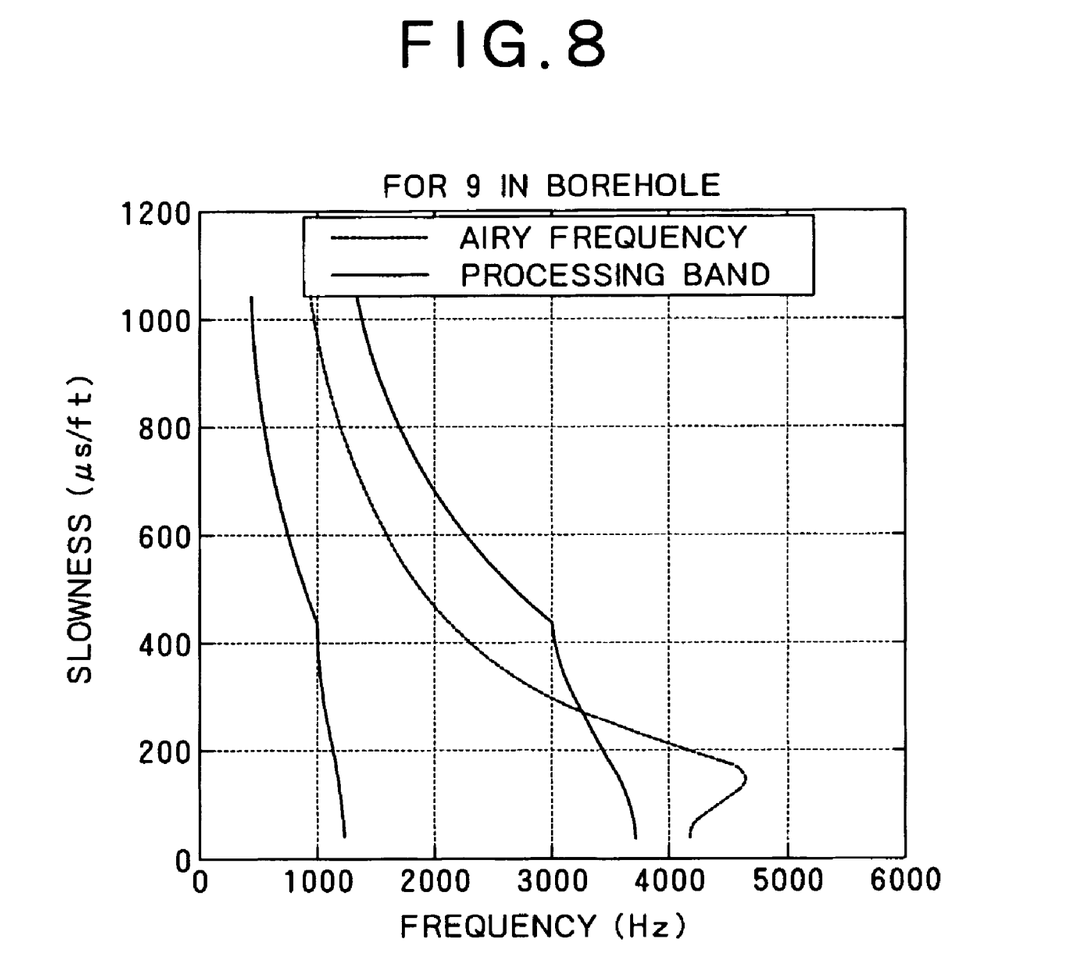
FIG. 8 shows that the dynamic filter band varies with depth, and depends on the equivalent borehole diameter, and the stacking slowness.
Figure 9:
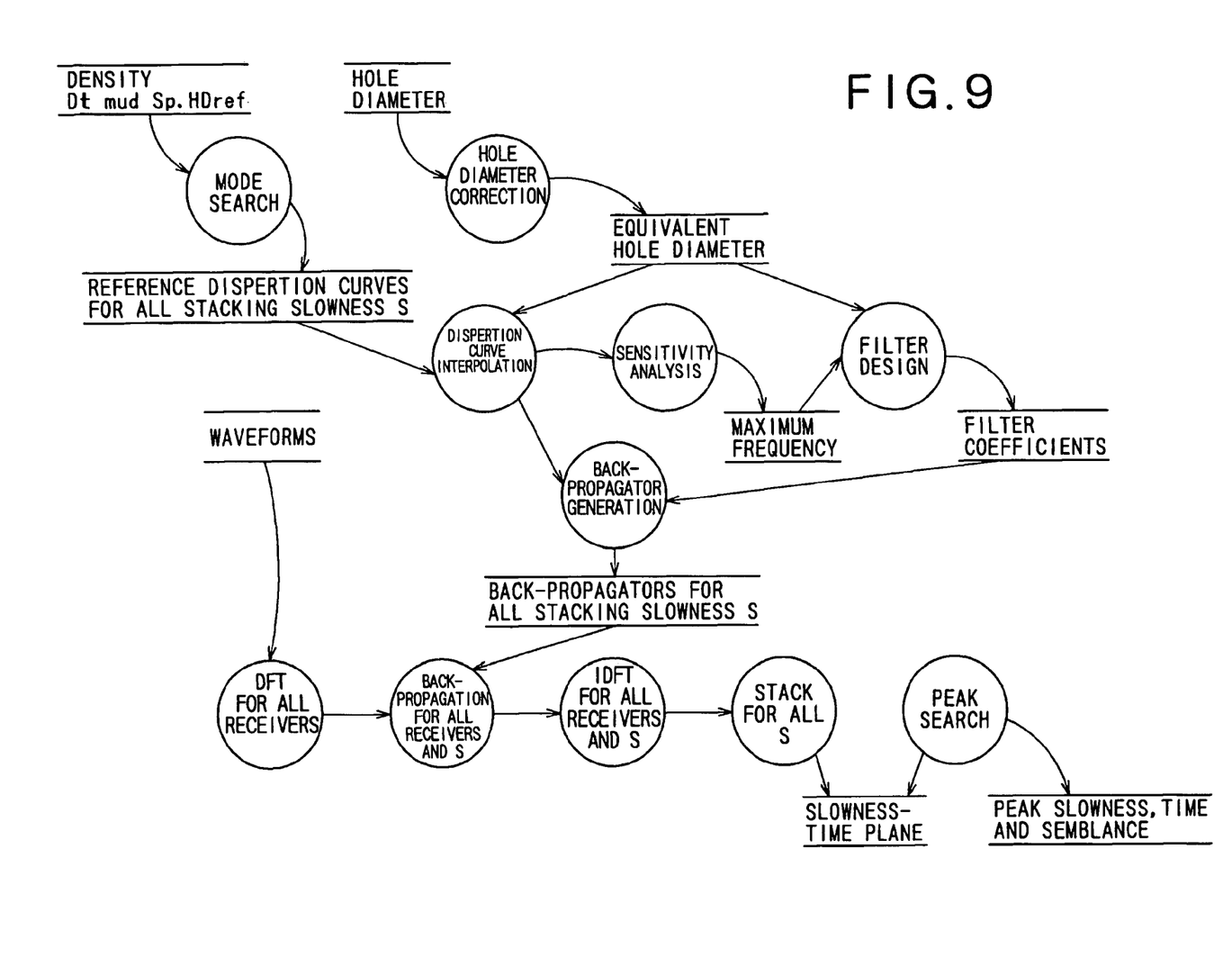
FIG. 9 show an overall flow chart of one embodiment in accordance with the invention.

In some embodiments, the waveforms may be dynamically filtered before the back propagation and stacking in the DSTC processing. The dynamic filter band varies with depth, and depends on the equivalent borehole diameter, d_e, and the stacking slowness, S (FIG. 8). The present invention comprises a modified DSTC process comprising computing the semblance ρ(S, τ) as follows:

Let $Xk(f) = F\{xk(t)\}$, (9)

$$\rho(S,\tau) = \frac{\sum_{t=\tau-T}^{\tau} \left| \sum_{k=1}^{M} F^{-1}\{W(f,S,d)X_k(f)e^{-2\pi f i \tau_k \alpha(f,S,d)}\} \right|^2}{\sum_{t=v-T}^{T} \sum_{k=1}^{M} |F^{-1}\{W(f,S,d)X_k(f)e^{-2\pi f i \tau_k \alpha(f,S,d)}\}|^2}$$

where xk(t) is the signal of the $k^{th}$ receiver, t is the sample time, f is the frequency, F { } is Fourier transform, $F^{-1}${ } is the inverse Fourier transform, S is the formation shear slowness (parameter to be estimated), d is the borehole diameter, τ is the position of integration time window, W(f, S, d) is the filter response whose cut-off frequencies are dynamically computed depending on the formation shear slowness S and borehole diameter d, α(f, S, d) is theoretical phase delay per unit length at frequency f, i is the square root of (−1), $r_k$ is the distance between the $k_{th}$ receiver and the stacking reference point, M is the number of receivers and T is the length of the time window in which the semblance is calculated. The overall data flow may be as shown in FIG. 9. Note that the mode search is performed to produce a set of reference dispersion curves for each stacking slowness and the back-propagator is generated for each stacking slowness and for each receiver. The optimal processing band is then calculated and the filters are designed for each stacking slowness. The filter coefficients are multiplied to the back-propagator so that the back-propagated waveform is automatically filtered to have the optimum frequency band.

In some embodiments the inverse Fourier transform takes only the positive frequency part into account so that the results become complex analytic signals and their norm are the envelopes of the stacked frequency.

The present method of processing of acoustic data automatically adjusts the processing frequency band to reject the model error, including the tool effect. An equivalent borehole diameter was introduced to approximate the dispersion curve with the tool effect by scaling the dispersion curve without tool effect. The processing uses the equivalent borehole diameter via a pre-computed table of the scale factors. The description and figures above present a methodology and apparatus for dynamically filtering acoustic waveforms.

The preceding description has been presented only to illustrate and describe the invention. It is not intended to be exhaustive or to limit the invention to any precise form disclosed. Many modifications and variations are possible in light of the above teaching. The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of processing flexural wave acoustic data from a tool in a borehole traversing a formation, comprising:
    using the tool to transmit and receive the flexural wave acoustic data in the borehole;
    generating a set of estimated slowness curves from the flexural wave acoustic data;
    determining an upper limit for a frequency filter band;
    determining a lower frequency limit for the frequency filter band;
    compensating for effect of a tool comprising defining a modified borehole diameter by determining the residual difference R between two dispersion curves as $$R = \sum_f |S_{S_k}(S, f)\{S_{tool}(S, f, d) - S_{empty}(S, f, d + a(S, d))\}|^2$$

wherein S is formation shear slowness; $S_{s_s}$ is sensitivity to the formation shear slowness, $S_{tool}$ is a dispersion curve with a tool present; $S_{empty}$ is a dispersion curve without the presence of a tool, d is borehole diameter; f is frequency; and a is a constant.

2. The method of claim 1, further comprising minimizing R for a for each combination of S and d.

3. The method of claim 2, further comprising generating a table of offsets (S,d) for more than one dispersion curve.

4. The method of claim 1, further comprising determining uncertainty in the estimated slowness curves comprising calculating the ratio of sensitivity to borehole diameter to sensitivity to formation shear slowness.

5. The method of claim 1, wherein an uncertainty e in a shear slowness is estimated as:

$$e(S, f) = \frac{s_{hd}(S, f)}{s_{shear}(S < f)} \delta_{hd},$$

wherein S is formation shear slowness; f is frequency, $s_{shear}$ is sensitivity to the formation shear slowness, $s_{hd}$ is sensitivity to borehole diameter; and $\delta_{hd}$ is uncertainty in borehole diameter measurement.

6. The method of claim 5, wherein determining an upper limit for a frequency filter band comprises defining the upper limit wherein E is calculated as $$E \geq \int_0^{f_u} e(S, f) df,$$

and wherein E is a predefined threshold.

7. A method of processing flexural wave acoustic data from a tool in a borehole traversing a formation, comprising:
    using the tool to transmit and receive the flexural wave acoustic data in the borehole;
    generating a set of estimated slowness curves from the flexural wave acoustic data;
    determining an upper limit for a frequency filter band;
    determining a lower frequency limit for the frequency filter band;
    determining effect of a tool; and
    applying the frequency filter band and the tool effect in calculating semblance, wherein an uncertainty e in a shear slowness is estimated as:

$$e(S, f) = \frac{s_{hd}(S, f)}{s_{shear}(S, f)} \delta_{hd},$$

wherein S is formation shear slowness; f is frequency, $s_{shear}$ is sensitivity to the formation shear slowness, $s_{hd}$ is sensitivity to borehole diameter; and $\delta_{hd}$ is uncertainty in borehole diameter measurement.

8. The method of claim 7, further comprising determining uncertainty in the estimated slowness curves comprising calculating the ratio of sensitivity to borehole diameter to sensitivity to formation shear slowness.

9. The method of claim 7, wherein determining an upper limit for a frequency filter band comprises defining the upper limit wherein E is calculated as $$E \geq \int_0^{f_u} e(S, f) df,$$

and wherein E is a predefined threshold.

10. The method of claim 7, wherein semblance ρ(S, τ) is computed as:

$$\rho(S,\tau) = \frac{\sum_{t=\tau-T}^{\tau}\left|\sum_{k=1}^{M}F^{-1}\{W(f,S,d)X_k(f)e^{-2\pi fir_1\alpha(f,S,d)}\}\right|^2}{\sum_{t=v-T}^{T}\sum_{k=1}^{M}|F^{-1}\{W(f,S,d)X_k(f)e^{-2\pi fir_1\alpha(f,S,d)}\}|^2}$$

where xk(t) is the signal of the $k^{th}$ receiver;
t is sample time;
f is frequency;
F{ } is a Fourier transform; $F^{-1}$ { } is an inverse Fourier transform;
S is formation shear slowness;
d is borehole diameter;
τ is the position of the integration time window,
W(f, S, d) is the filter response at the cut-off frequencies dynamically computed on the formation shear slowness S;
borehole diameter d, α(f, S, d) is theoretical phase delay per unit length at frequency f;
i is the square root of (−1),
$r_k$ is the distance between the $k^{th}$ receiver and the stacking reference point;
M is the number of receivers; and
T is the time window length in which the semblance is calculated.

11. The method of claim 7, wherein the step of generating a set of curves comprises determining a sensitivity cut-off frequency.

12. The method of claim 7, wherein determining a sensitivity cut-off frequency comprises modeling a dispersion curve for a set of borehole parameters.

13. The method of claim 12, wherein the set of borehole parameters is selected from the group consisting of borehole diameter, fluid slowness, density, formation shear slowness, ratio of compressional slowness to shear slowness, and ratio of formation density to fluid density.

14. A method of processing acoustic data collected using a borehole tool disposed in a borehole comprising:
defining a modified borehole diameter, said modified borehole diameter including the effects of the presence of said borehole tool in said borehole;
using the borehole tool to transmit and receive the acoustic data in the borehole;
processing said acoustic data at least in part using the modified borehole diameter such that the processed acoustic data includes the effects of the presence of said borehole tool in said borehole,
wherein defining the modified borehole diameter comprises minimizing difference between flexural dispersion in the presence of said borehole tool and flexural dispersion in the absence of said borehole tool over a selected bandwidth,
wherein minimizing difference between flexural dispersion in the presence of said borehole tool and flexural dispersion in the absence of said borehole tool. over a selected bandwidth comprises calculating the residual difference R between two dispersion curves as $$R = \sum_f |S_{S_s}(S,f)\{S_{tool}(S,f,d) - S_{empty}(S,f,d+a(S,d))\}|^2$$

wherein S is formation shear slowness; $S_{Ss}$ is sensitivity to the formation shear slowness, $S_{tool}$ is a dispersion curve with a tool present; $S_{empty}$ is a dispersion curve without the presence of a tool, d is borehole diameter; is frequency; and a is a constant.

15. The method of claim 14, further comprising minimizing R for a for each combination of S and d.

16. The method of claim 15, further comprising generating a table of offsets (S, d) for more than one dispersion curve.

* * * * *